(12) United States Patent
Levizzi et al.

(10) Patent No.: US 10,851,861 B2
(45) Date of Patent: Dec. 1, 2020

(54) BRAKING DEVICE

(71) Applicant: FRENI BREMBO S.P.A., Bergamo (IT)

(72) Inventors: Roberto Levizzi, Curno (IT); Alessandro Maria Travagliati, Curno (IT)

(73) Assignee: Freni Brembo S.p.A., Bergamo (IT)

( * ) Notice: Subject to any disclaimer, the term of this patent is extended or adjusted under 35 U.S.C. 154(b) by 0 days.

(21) Appl. No.: 16/306,657

(22) PCT Filed: Jun. 1, 2017

(86) PCT No.: PCT/IB2017/053235
§ 371 (c)(1),
(2) Date: Dec. 3, 2018

(87) PCT Pub. No.: WO2017/208188
PCT Pub. Date: Dec. 7, 2017

(65) Prior Publication Data
US 2019/0136924 A1    May 9, 2019

(30) Foreign Application Priority Data

Jun. 3, 2016 (IT) .......................... 102016000057245

(51) Int. Cl.
*F16D 65/12* (2006.01)
*F16D 55/32* (2006.01)
(Continued)

(52) U.S. Cl.
CPC ......... *F16D 65/123* (2013.01); *F16D 55/225* (2013.01); *F16D 55/32* (2013.01);
(Continued)

(58) Field of Classification Search
CPC ..... F16D 2065/1316; F16D 2065/1396; F16D 2065/1348; F16D 2065/1356; F16D 65/123
(Continued)

(56) References Cited

U.S. PATENT DOCUMENTS 3,692,148 A    9/1972  Hauth
4,662,482 A    5/1987  Bass
(Continued)

FOREIGN PATENT DOCUMENTS

DE    19850180 A1    7/1999
DE     1074757 A1    7/2001
(Continued)

OTHER PUBLICATIONS

European Patent Office, International Search Report with Written Opinion issued in PCT/IB2017/053235, dated Sep. 15, 2017, 10 pages, European Patent Office, Rijswijk, Netherlands.

*Primary Examiner* — Bradley T King
(74) *Attorney, Agent, or Firm* — Marshall & Melhorn, LLC

(57) ABSTRACT

A braking device for a vehicle may have a disc with a disc body with at least one connection portion. The connection portion having at least one arm, which projects cantilevered. The arm has a free terminal end and an attachment root. The root has at least one contact area of an elastic element with seat walls. The at least one arm has at least one working portion which touches the engagement portion of a bush and affects the bush to abut against a dragging surface.

11 Claims, 12 Drawing Sheets

(51) Int. Cl.
*F16D 55/225* (2006.01)
*F16D 65/02* (2006.01)
*F16D 125/14* (2012.01)
*F16D 55/00* (2006.01)

(52) U.S. Cl.
CPC ............. *F16D 2055/0062* (2013.01); *F16D 2065/1368* (2013.01); *F16D 2065/1384* (2013.01); *F16D 2065/1392* (2013.01); *F16D 2065/1396* (2013.01); *F16D 2125/14* (2013.01)

(58) Field of Classification Search
USPC ..................................... 188/218 XL
See application file for complete search history.

(56) References Cited

U.S. PATENT DOCUMENTS

| | | | | |
|---|---|---|---|---|
| 4,848,521 | A | * | 7/1989 | Izumine ............... F16D 65/123 |
| | | | | 188/18 A |
| 6,116,386 | A | * | 9/2000 | Martin ................. F16D 65/123 |
| | | | | 188/218 XL |
| 2002/0157908 | A1 | * | 10/2002 | Burgoon ............. F16D 65/0006 |
| | | | | 188/218 XL |
| 2005/0045452 | A1 | | 3/2005 | Iseli |
| 2006/0113153 | A1 | * | 6/2006 | Simmonds ............... F16D 65/12 |
| | | | | 188/218 XL |
| 2011/0079474 | A1 | * | 4/2011 | Fujita ...................... F16D 65/12 |
| | | | | 188/218 XL |
| 2014/0124309 | A1 | * | 5/2014 | Kim ..................... F16D 65/123 |
| | | | | 188/218 XL |
| 2017/0114846 | A1 | * | 4/2017 | Chen .................... F16D 65/123 |

FOREIGN PATENT DOCUMENTS

| | | |
|---|---|---|
| DE | 102004034676 A1 | 2/2006 |
| DE | 102004035900 A1 | 3/2006 |
| EP | 1074757 A1 | 2/1999 |
| GB | 2093949 A | 9/1982 |
| WO | 032092592 A2 | 11/2003 |
| WO | 2004063592 A1 | 7/2004 |
| WO | 2011138714 A1 | 11/2011 |

* cited by examiner

BRAKING DEVICE

FIELD OF THE INVENTION

The object of the present invention is a braking device for a vehicle.

The present invention also relates to a disc brake and also to a vehicle.

The present invention also relates to a method for assembling a braking device.

More specifically, the present invention relates to a braking device particularly suitable for, but not necessarily intended to, motorcycles.

BACKGROUND ART

The brake caliper in a disc brake is generally arranged straddling the outer peripheral edge of a brake disc, suitable for rotating about a rotation axis (A-A) defining an axial direction (X-X). Moreover, in a disc brake there is defined a radial direction (R-R) which is substantially orthogonal to said axial direction (X-X), and a tangential (C-C) or circumferential direction (C-C), orthogonal both to said axial direction (X-X) and to said radial direction (R-R).

Brake calipers are constrained to a support structure which remains stationary with respect to the vehicle wheel, such as for example an axle-journal of a suspension of a vehicle or a hub of a vehicle wheel or a fork or a fork of a motorcycle. The brake caliper usually comprises a caliper disc body having two elongated portions arranged facing opposite braking surfaces of a brake disc, and at least one bridge which connects said two elongated portions to each other. The conveniently actuated calipers press the pads against the braking band, and the braking action is generated by the friction between the pads and the braking band of the brake disc. In the case of applications for motorcycles, a typical embodiment provides a plurality of studs provided on the wheel of the vehicle which are suitable for forming coupling surfaces for the brake disc, which comprises a plurality of reciprocal coupling seats which are usually spaced apart equally from one another in tangential or circumferential direction.

It is generally known to make this type of disc applications in which the axial auto-alignment between brake disc and brake pads is allowed by the possibility of axially adjusting the disc with respect to the support thereof. In these braking devices, the braking band is not integral with the wheel hub but is engaged thereto in coaxial alignment by means of a movable coupling which also allows a radial expansion. Such a radial expansion is due to the effect of the heating generated by the heat generated due to friction.

In such known embodiments, elastic means are used in order to bring the disc back to a neutral position with respect to the brake pads, which elastic means are suitable for generating an axial thrust on the disc which brings the disc back to a predefined axial resting position thereof as the braking action ceases. A solution of this type is known, for example, from document EP-1074757, to the same Applicant. Further examples of solutions of this type are shown in documents U.S. Pat. Nos. 4,662,482, 3,692,148, US-2005-45452, WO-2004-063592, GB-2093949, DE-102004035900 and DE-102004034676.

However, often such a predefined axial resting position does not coincide with such a position as not to bring the disc in contact with the brake pads. Moreover, the axially elastic return action may cause undesired discontinuous sliding contacts between brake disc and at least one of the brake pads also when the brake is not actuated, with subsequent irregular wear and possibility over time of the occurrence of even significant vibration phenomena. Such vibration phenomena in turn cause an emphasis of the irregularity of the wear conditions and accordingly a premature need to replace the brake disc. On the other hand, the need is felt to avoid the disc from warping or tilting due to manufacturing imperfections of the support or incorrect axial positioning.

A solution of braking device is known from document WO-2011-138714 to the same Applicant, comprising a leaf spring inserted in each of the coupling seats provided in the brake disc to affect the disc only tangentially. Therefore, such a solution does not have elastic elements which generate axial thrusts on the disc. The axial positioning of the disc is kept in balance by the friction between disc and wheel hub connection element, which is favorably amplified by the tangential elastic thrust action of the leaf spring. The absence of any elastic return in axial direction allows the achieved balance position of the disc to be kept due to the axial adjustment actions exerted by the brake pads which tighten the disc during the braking action.

Although it is advantageous under some points of view, this known solution has drawbacks. Indeed, in order to face the functional leaf portion to the vehicle connection element, such a spring requires at least four separate support points distributed over at least four surfaces of the walls which delimit the coupling seat of the brake disc. Therefore, the desired operation of such a leaf spring mainly depends on the related position taken on by the surfaces which provide such four separate support surfaces, and also on the surface finish of such surfaces. In order for the tangential elastic action not to be indeterminate, this forces the walls of the coupling seats to be made within highly maximum manufacturing tolerances. When the above-indicated tolerances may not be achieved, for example to reduce the production costs, a differentiated elastic response is generated in each leaf spring which results in a non-uniform elastic effect on the various radial segments of the disc, which may result in undesired effects such as knocking noises and also misalignment of the disc with respect to the pads and premature wear of the braking system. At the same time, the above-mentioned features make such a known solution unsuitable for allowing accurate calibration operations of the elastic response by only acting on the properties of the leaf spring, but force considering the actual manufacturing tolerances of each of the walls of the coupling seats of the disc.

Solution

It is an object of the present invention to obviate the drawbacks of the prior art.

It is an object of the present invention to provide an improved braking device with respect to known solutions.

These and other objects are achieved with a braking device according to claim 1, and also with a disc brake according to claim 9, and also a vehicle according to claim 10.

Certain advantageous embodiments are the object of the dependent claims.

According to one aspect of the invention, a braking device for a vehicle comprises a disc of a disc brake suitable for rotating about a rotation axis, in which said disc comprises a disc body and in which said disc body comprises a braking band having opposite braking surfaces. Said disc body comprises at least one connection portion suitable for connecting the disc to a connection device of a vehicle associable with the braking device, and in which said connection portion comprises seat walls which delimit at least one seat, and in which said seat walls comprise at least one dragging surface suitable for receiving a thrust action directed in tangential direction, and at least one abutment surface opposed to said dragging surface. Said braking device further comprises at least one bush suitable for being connected to a portion of said connection device, in which said bush comprises at least one engagement portion which is inserted with clearance into said seat. Said braking device comprises at least one elastic element interposed between said abutment surface and said engagement portion of said bush.

According to one aspect of the invention, said at least one elastic element comprises at least one arm, which projects cantilevered into said seat and which comprises a free terminal end and an attachment root, which comprises at least one contact area of said elastic element with said seat walls, in which said at least one arm comprises at least one working portion which touches said engagement portion of said bush and affects said bush to abut against said dragging surface.

According to one aspect of the invention, said seat walls of said disc body comprise at least one dragging support wall and at least one abutment support wall, opposed to said at least one dragging support wall, and said connection portion of said disc body comprises at least one dragging protrusion which protrudes cantilevered from said dragging support wall into said seat, said dragging protrusion comprising said dragging surface, and in which said connection portion of said disc body comprises at least one abutment protrusion which protrudes cantilevered from said abutment support wall into said seat, said abutment protrusion comprising said abutment surface. Thereby, opposed contact areas may be defined of the disc body with the bush and with the elastic element, respectively, in which the definition of the static and dynamic behavior of the interactions between the disc body and elastic element or bush is of significantly improved predictability with respect to known solutions.

According to one aspect of the invention, said disc body comprises a plurality of connection portions in which said plurality of connection elements are equally spaced from one another in tangential direction.

DRAWINGS

Further features and advantages of the device, of the disc brake and of the vehicle will be apparent from the description provided below of preferred embodiments thereof, given by way of non-limiting examples, with reference to the accompanying drawings, in which.

DESCRIPTION OF SOME PREFERRED EMBODIMENTS

Figure 1:
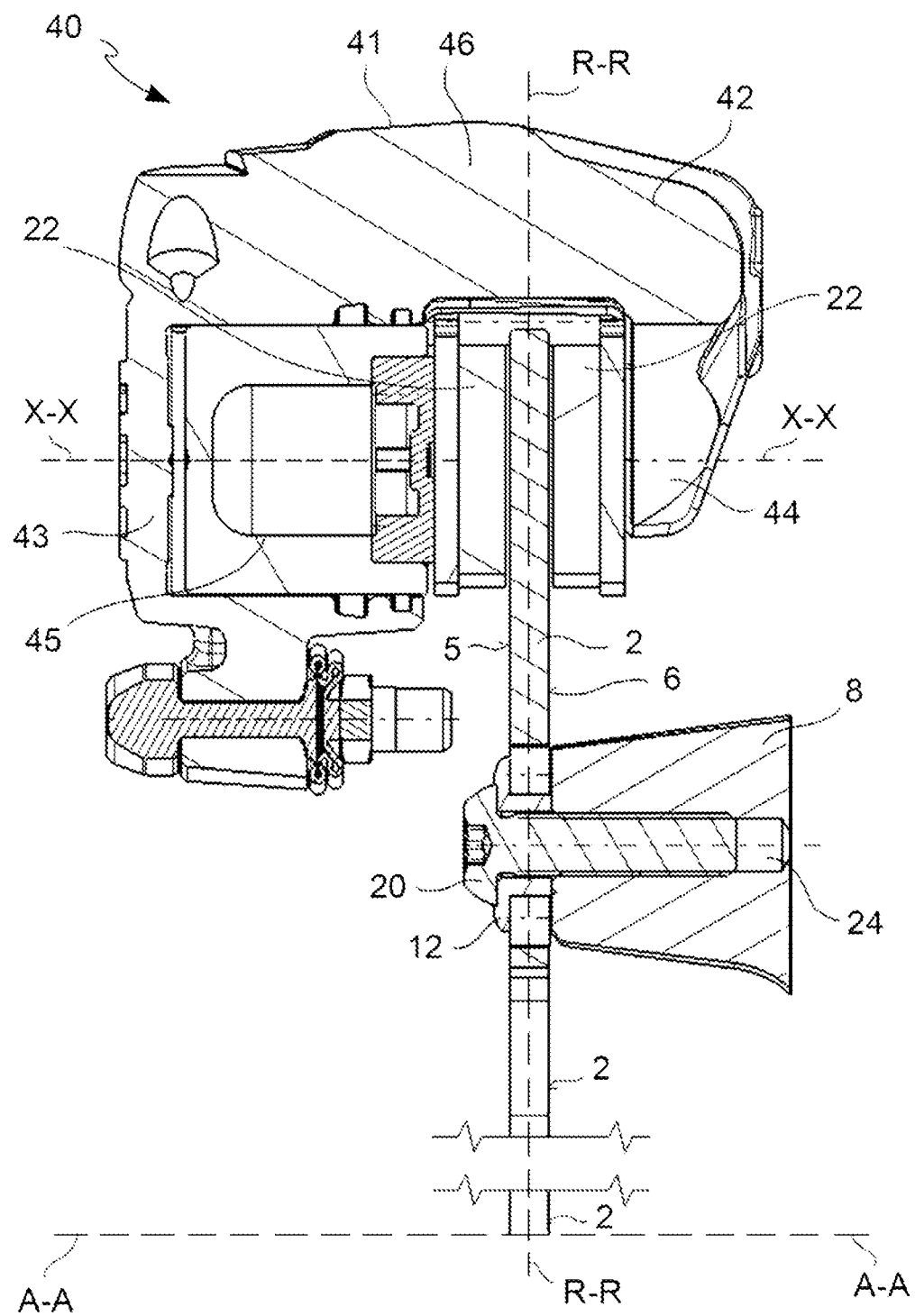
FIG. 1 is a sectional view made on a plane defined by the axial and radial directions, which shows a disc brake.
Figure 2A:
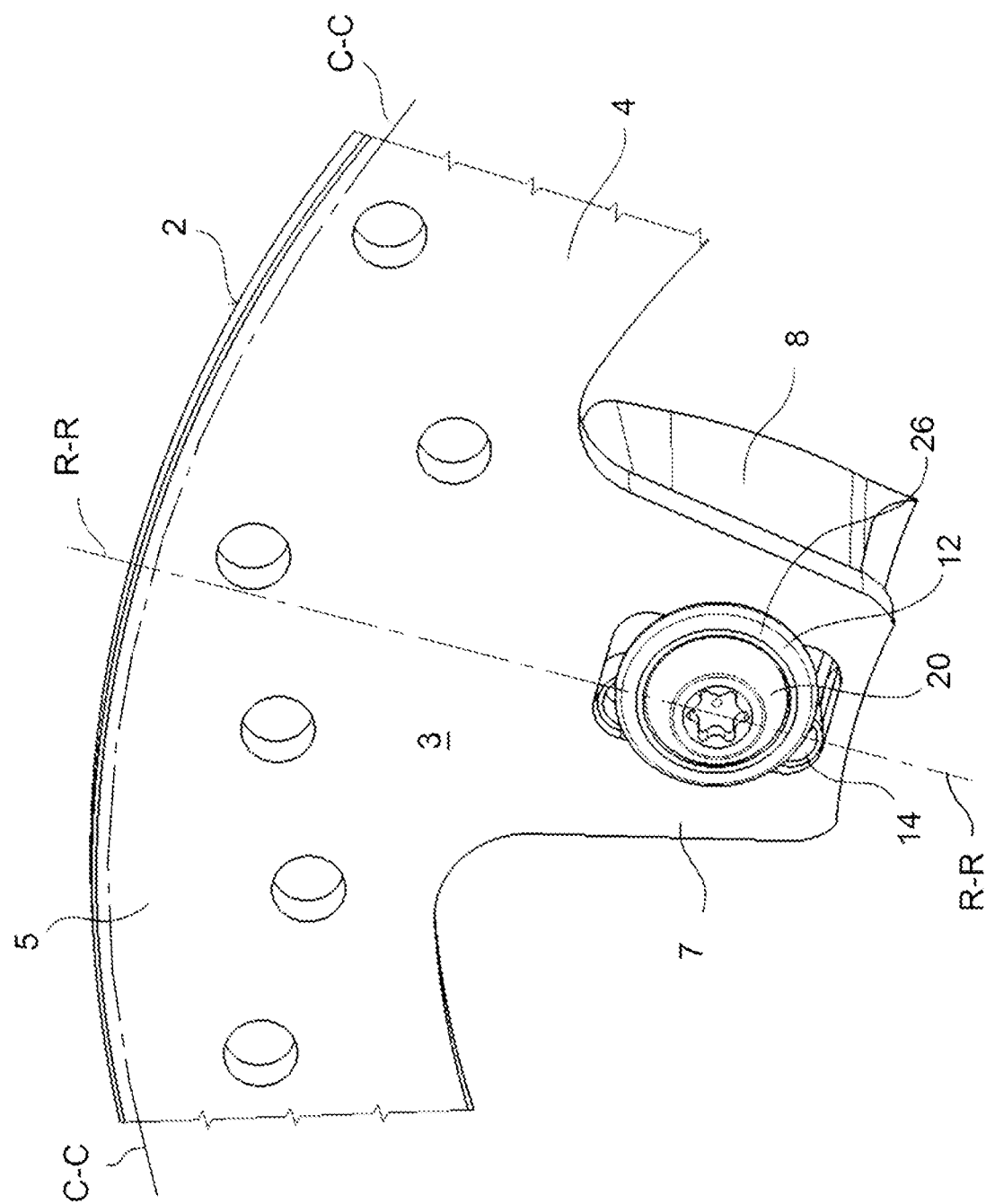
FIG. 2A is an axonometric view illustrating a braking device according to one embodiment, comprising a portion of disc in which the braking device is connected to a connection device of an associable vehicle.
Figure 2B:
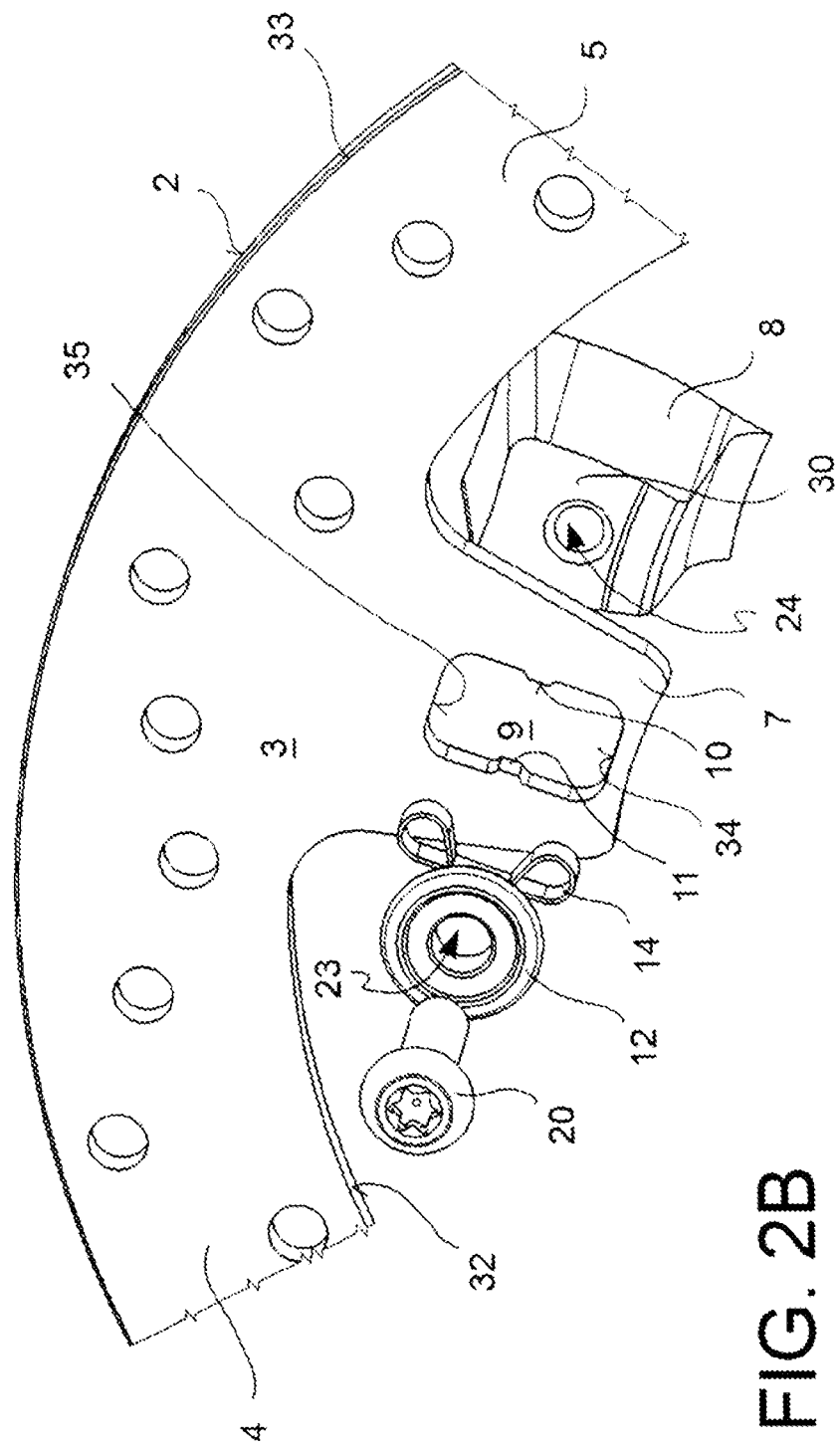
FIG. 2B is an axonometric view in separate parts illustrating a braking device according to one embodiment, comprising a portion of disc in which the braking device is connected to a connection device of an associable vehicle.
Figure 3:
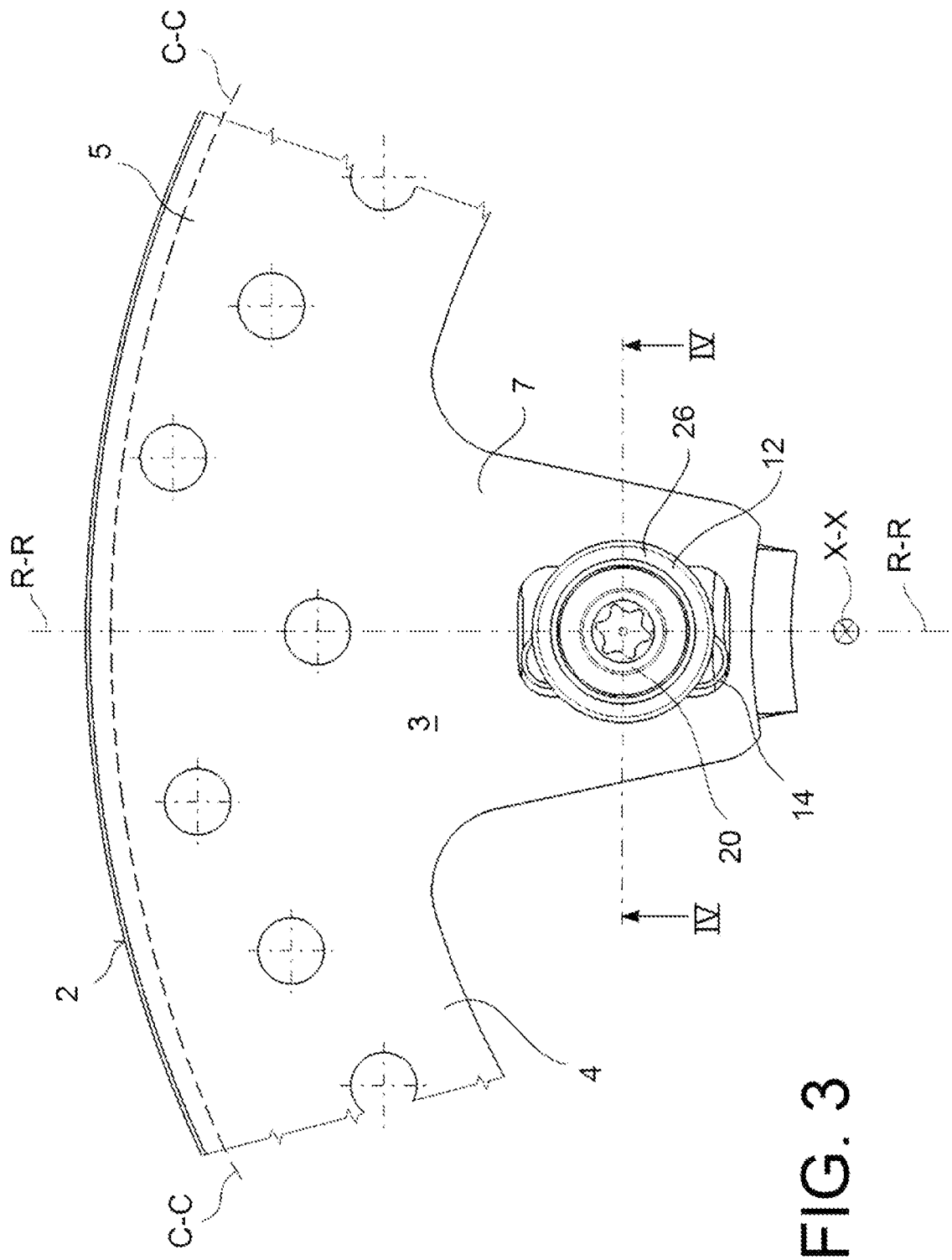
FIG. 3 is a raised view on a plane defined by the radial and circumferential directions, illustrating a braking device according to one embodiment, comprising a portion of disc, which faces a first braking surface, in which the braking device is connected to a connection device of an associable vehicle.
Figure 4:
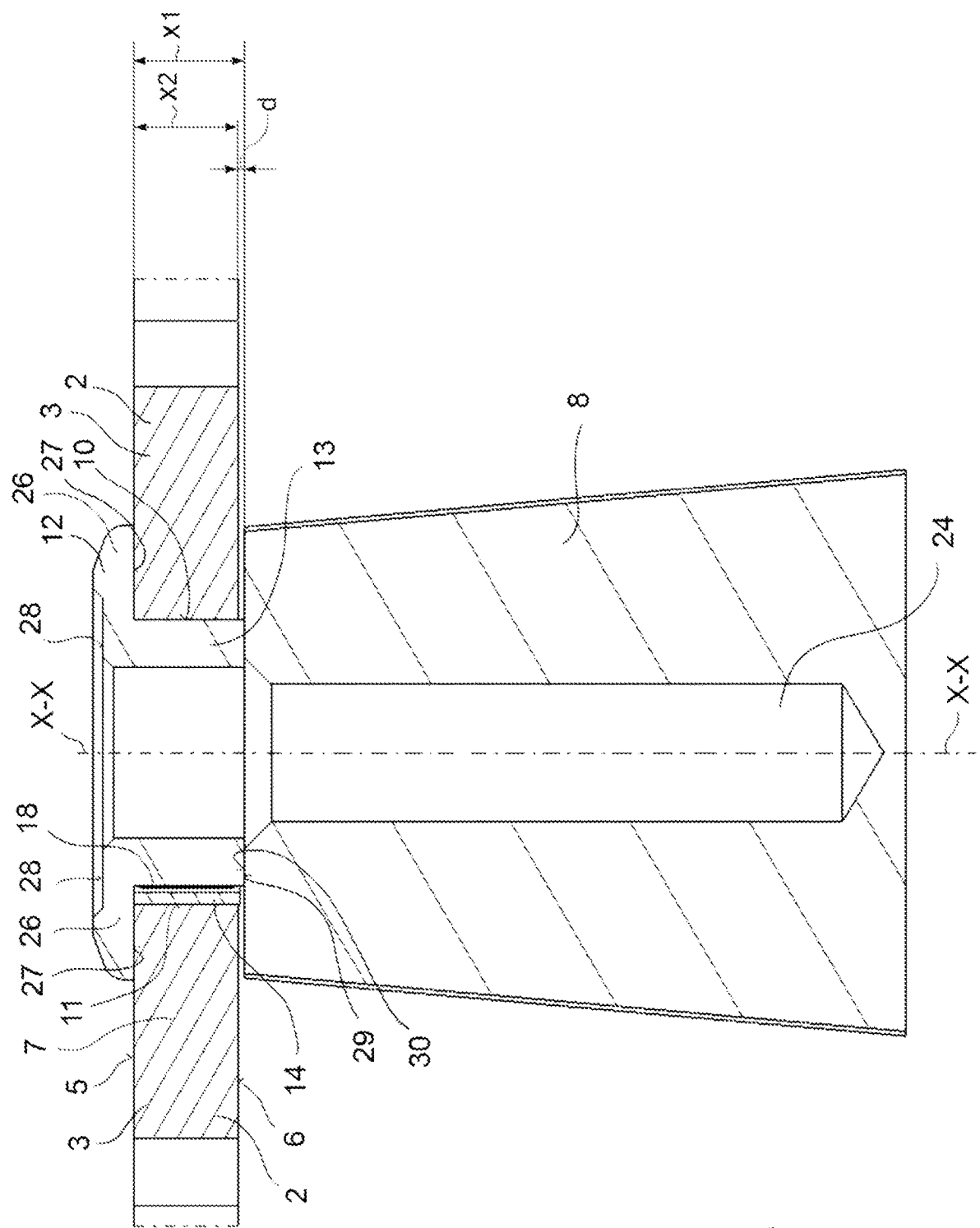
FIG. 4 is a sectional view made according to the cutting plane indicated by the arrows IV-IV in FIG. 3, in which the fixing element was removed for clarity.
Figure 5:
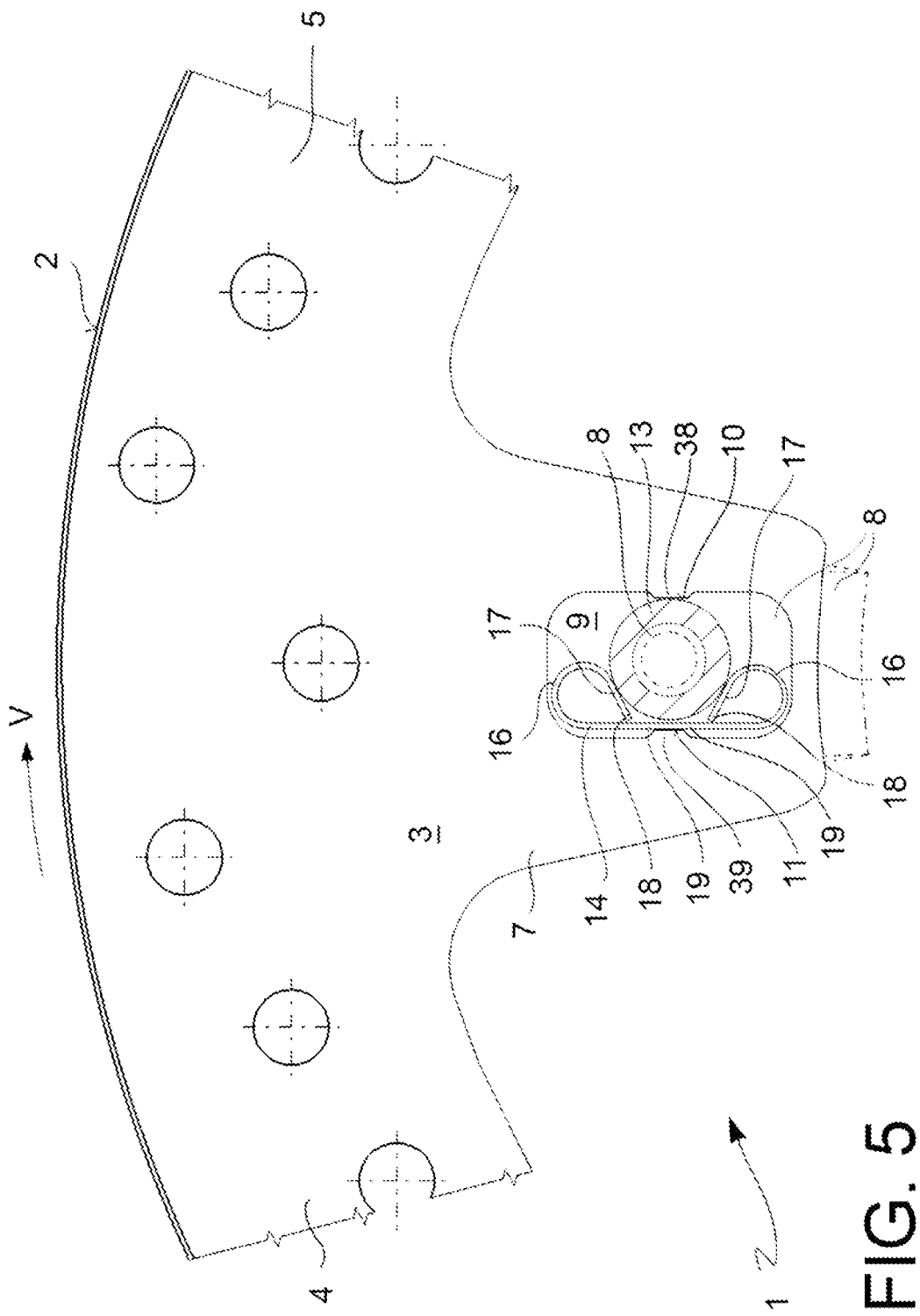
FIG. 5 is a sectional view made according to the plane on which lies a first braking surface shown in FIG. 3, in which a dotted line traces the outline of the connection device of an associable vehicle.
Figure 6:
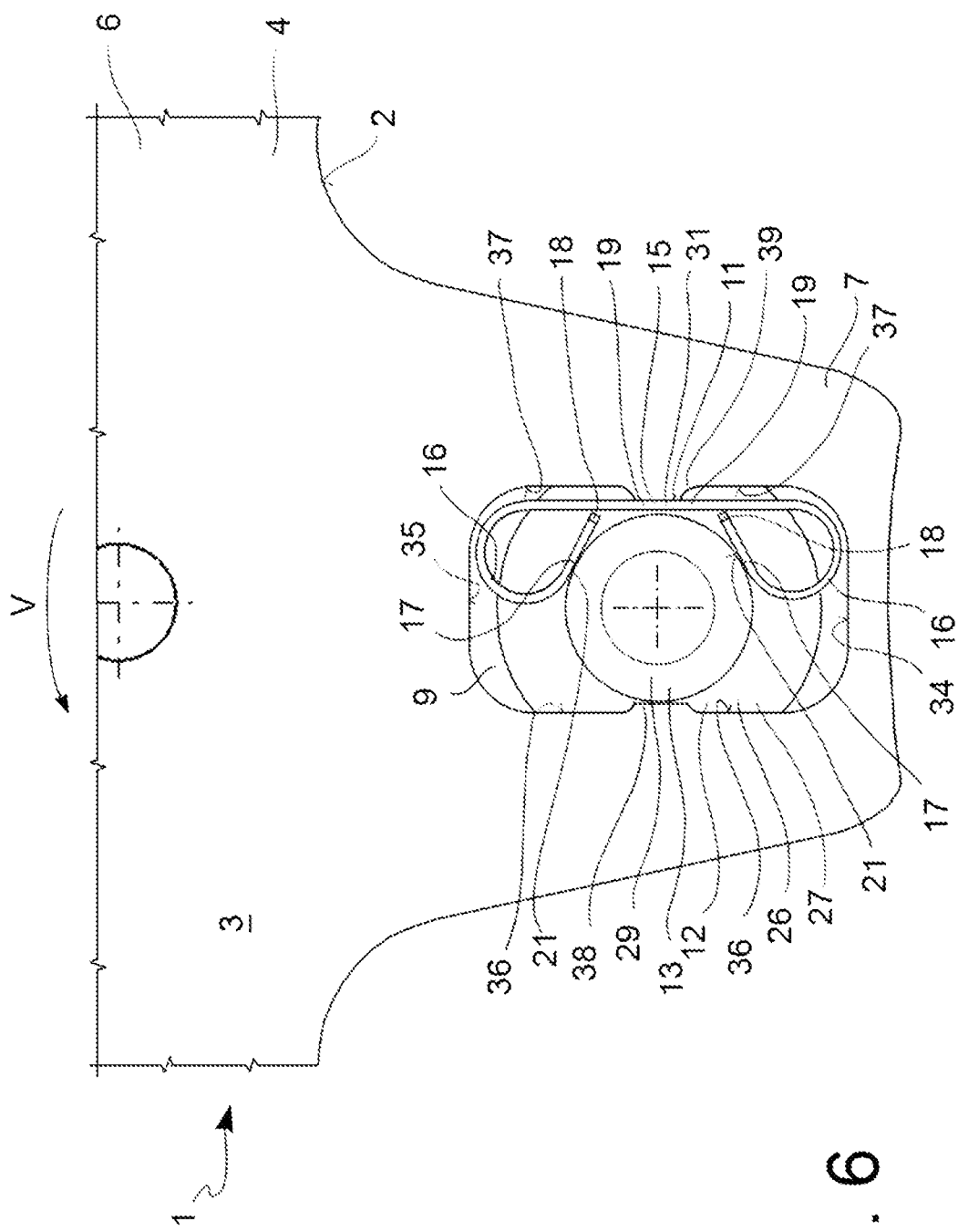
FIG. 6 is a raised view on a plane defined by the radial and circumferential directions, illustrating a braking device according to one embodiment, comprising a portion of disc, which faces a second braking surface, in which the braking device is connected to a connection device of an associable vehicle.

According to a general embodiment, there is provided a braking device 1.

Said braking device 1 is suitable for vehicles and is particularly suitable for, but not necessarily intended to, motorcycles. For example, the solutions proposed may be applied to racing motorcycles and also to motorcycles, scooters, three-wheeled motorcycles or scooters, three-wheeled motorcycles, and also snowmobiles. According to the application, modifications will be made which in any case do not modify the concept of the present invention. The present invention may also be applied in the automotive field.

Said braking device 1 comprises a disc 2 of a disc brake 40, suitable for rotating about a rotation axis A-A.

Said disc 2 of a disc brake 40 comprises a disc body 3. According to one embodiment, said disc 2 is a "micro-sliding" disc suitable for sliding axially by an adjustment movement. The present invention also applies to floating discs.

Said disc body 3 comprises a radially inner edge 32 facing the rotation axis A-A and a radially outer edge 33, opposite to said radially inner edge 32.

Said disc body 3 comprises a braking band 4 having opposite braking surfaces 5, 6.

According to one embodiment, said opposed braking surfaces 5, 6 comprise a first braking surface 5 and a second braking surface 6, opposite to said first braking surface 5.

Said disc body 3 comprises at least one connection portion 7, suitable for connecting disc 2 to a connection device 8 of a vehicle associable with the braking device 1. According to one embodiment, said connection device 8 is at least a portion of a spoke. According to one embodiment, said connection device 8 is at least a portion of a stud.

Said connection portion may be variously shaped. According to one embodiment, said connection portion 7 comprises at least one radial protrusion which protrudes towards the rotation axis A-A of disc 2. Thereby, said connection portion may be located outside braking band 4.

Said braking band 4 defines an axial direction X-X parallel to the rotation axis A-A of disc 2, a radial direction R-R orthogonal to the axial direction X-X and a tangential direction C-C or circumferential direction C-C, orthogonal both to the axial direction X-X and to the radial direction R-R.

According to one embodiment, said circumferential direction C-C is parallel to at least one of said opposed braking surfaces 5, 6.

Said connection portion 7 comprises seat walls 10, 11, 34, 35, 36, 37 which delimit at least one seat 9.

According to one embodiment, said seat 9 is made in a portion of the disc body 3 of disc 2 which is radially inner with respect to the braking band 4, and in particular with respect to the surfaces brushed by brake pads 22 associable with the braking device and defining the first braking surface 5 and the second opposed braking surface 6.

Said seat walls 10, 11, 34, 35, 36, 37 comprise at least one dragging surface 10 suitable for receiving a thrust action directed in circumferential direction C-C and at least one abutment surface 11 or circumferential abutment surface 11, opposed to said dragging surface 10. According to one embodiment, said dragging surface 10 and said abutment surface 11 are parallel to each other.

According to one embodiment, said dragging surface 10 is located in circumferential direction C-C in the disc rotation direction V, when under forward gear conditions of the associable vehicle.

According to one embodiment, said seat walls 10, 11, 34, 35, 36, 37 comprise a radially inner wall 34 and an opposed radially outer wall 35, in which said radially inner wall is located at a shorter radial distance from the rotation axis A-A of disc 2 with respect to said radially outer wall 35.

Said braking device 1 further comprises at least one bush 12 suitable for being connected to a portion of said connection device 8.

Said bush 12 comprises at least one engagement portion 13 which is inserted with clearance into said seat 9. Thereby, the disc body 3 comprising said seat walls 10, 11, 34, 35, 36, 37 is free to move with respect to said bush 12 in axial direction X-X, in radial direction R-R and in circumferential direction C-C. Preferably, the braking band 4 is movable axially by micro-adjustment movements.

Said braking device 1 comprises at least one elastic element 14 interposed between said abutment surface 11 and said engagement portion 13 of said bush 12.

According to one embodiment, said elastic element 14 is fitted onto the engagement portion 13 of bush 12 before the insertion into said seat 9.

According to a preferred embodiment, said elastic element 14 is made of steel for springs. According to one embodiment, said elastic element 14 comprises at least one leaf spring.

Said at least one elastic element 14 comprises at least one arm 16, which projects cantilevered into said seat 9 and which comprises a free terminal end 18 and an attachment root 19, which comprises at least one contact point of said elastic element 14 and said seat walls 10, 11, 34, 35, 36, 37. The terminology "cantilevered" does not mean that said arm 16 is free from any contact but means that although said arm 16 is still in contact with bush 12, it extends from said attachment root 19, thus avoiding to again touch the seat walls 10, 11, 34, 35, 36, 37 of disc 2. In other words, travelling said arm 16 along the longitudinal direction of extension thereof from the free terminal end 18, first a portion in contact with bush 12 is encountered, then a portion in contact with at least one seat wall 10, 11 is encountered.

Advantageously, said at least one arm 16 comprises at least one working portion 17 which touches said engagement portion 13 of said bush 12 and affects said bush 12 to abut against said dragging surface 10.

The provision of such an elastic element 14 allows a preload to be exerted which keeps disc 2 in contact with said engagement portion 13 of said bush 12. Thereby, when the braking starts, said engagement portion 13 of said bush 12 is capable of promptly exerting a reaction, which is opposed to the braking force, on said dragging surface 10 of the disc body 3, thus simultaneously avoiding the occurrence of disturbing knocking noises due to blows between engagement portion 13 of bush 12 and dragging surface 10. Indeed, the provision of such an elastic element 14 substantially allows the stroke to be zeroed in circumferential direction C-C that the disc body 3 should travel to abut with the dragging surface 10 thereof against bush 12 when the braking starts, thus avoiding blows. Moreover, the provision of said working portion 17 of said arm 16 allows the movement in circumferential direction C-C of disc 2 to be contrasted with respect to bush 12 during the normal forward gear of the vehicle associable with the braking device 1.

As additional advantage, the provision of said at least one arm 16 arranged cantilevered and comprising said working portion 17 which affects said bush 12 to abut against said dragging surface 10 of the disc body 3 allows the circumferential thrust exerted by the elastic element 14 interposed between said abutment surface 11 of the disc body 3 and said engagement portion 13 of bush 12 to be calibrated in a highly accurate and reliable manner. This therefore allows fine-tuning operations to be performed. In particular, since it is arranged cantilevered, said at least one arm 16 remains free from stresses or constraints imposed by the seat walls 10, 11, 34, 35, 36, 37. Therefore, it affects bush 12 to abut against the dragging surface 10 of the disc body 3 in a foreseeable manner solely caused by the structural and dynamic design properties of said arm 16, thus avoiding structural imperfections of the seat walls 10, 11, 34, 35, 36, 37 to affect the action of the elastic element 14. Thereby, there may be a highly accurate control—or more accurate with respect to known solutions—on the actual interaction process between elastic element 14, bush 12 and disc body 3, thus improving the foreseeability and reliability of the braking device 1.

According to one embodiment, said working portion 17 of said arm 16 which touches said engagement portion 13 of said bush 12 exerts a mainly elastic thrust action on said bush 12 to abut against said dragging surface 10.

According to one embodiment, said working portion 17 of said arm 16 which touches said engagement portion 13 of said bush 12 exerts an exclusively elastic thrust action on said bush 12 to abut against said dragging surface 10.

According to a preferred embodiment, said working portion 17 of said arm 16 affects said bush 12 in radial direction R-R. Thereby, it may be avoided to affect the radial movement of thermal expansion of the disc body 3 and simultaneously it is guided. In other words, the disc body 3 is guided in the movement of radial thermal expansion while leaving it free to expand radially.

According to one embodiment, said at least one elastic element 14 comprises at least one friction surface 15 in contact with said abutment surface 11, which exerts a resistance action to the movement in axial direction X-X of disc 2 with respect to bush 12, thus avoiding to exert an elastic return or thrust action in axial direction X-X on disc 2.

According to one embodiment, said friction surface 15 comprises surface protrusions suitable for increasing the static and dynamic friction coefficient of such a friction surface 15, such as for example knurls or protrusions made by rotary roughening.

According to one embodiment, said at least one working portion 17 of said arm 16 comprises at least a contact surface 21 in contact with said engagement portion 13 of said bush 12, which exerts a resistance action to the movement in axial direction X-X of disc 2 with respect to bush 12, thus avoiding to exert an elastic return or thrust action in axial direction X-X on disc 2. This feature is particularly advantageous when provided combined with the preceding one.

Due to the braking device 1 described above, disc 2 is connected to the associable vehicle by means of means which allow the radial thermal expansion thereof and simultaneously allow the axial adjustment of disc 2 with respect to bush 12, thus controlling this movement by means of the friction between the elastic element 14 and bush 12 and also between the elastic element 14 and the disc body 3.

Under optimal operating conditions, said elastic element 14 comprises a single extended contact point 31 or a single contact area 31 which touches said seat walls 10, 11, 34, 35, 36, 37, thus avoiding to comprise a plurality of contact areas 31 separated by suspended stretches of said elastic element 14. The terminology "extended contact point" does not mean that the contact occurs in one point alone, but means a continuous contact area which avoids providing stretches in the air or stretches suspended between two consecutive support points of said elastic element 14. Preferably, said single contact area 31 is in contact with said abutment surface 11.

In reverse gear and under sudden deceleration conditions, when said elastic element 14 is highly deformed, it may comprise more than one contact area 31 which touches said seat walls 10, 11, 34, 35, 36, 37, thus forming suspended stretches of said elastic element 14 which are completely unsuitable for affecting said bush 12, while simultaneously allowing said at least one arm 16 to remain cantilevered and to comprise said at least one working portion 17, to affect bush 12 at least to abut against said dragging surface 10. For example, under particularly sudden acceleration or deceleration conditions, said elastic element 14 is highly deformed and may comprise at least one between a second contact area, which touches said radially inner wall 34, and a third contact area 35, which touches said radially outer wall 35. Thereby, not only said braking device 1 is made suitable under normal operating conditions, but it is also made suitable for facing extraordinary conditions which provide sudden accelerations or decelerations, without this altering the operating principle thereof, thus giving satisfactory reliability to the braking device 1.

According to one embodiment, said elastic element 14 comprises two of said arms 16 so as to form a pair of arms 16 which extend cantilevered with respect to a portion of said elastic element 14 in contact with said seat walls 10, 11, 34, 35, 36, 37. Thereby, there may be an improved action affecting radial direction R-R because bush 12 may be affected in radial direction R-R, thus avoiding sliding or rubbing of portions of said elastic element against said seat walls 10, 11, 34, 35, 36, 37. Moreover, thereby there may be a constant thrust resulting from auto-centering which tends to bring said bush back to a predefined portion of balance with respect to the seat walls 10, 11, 34, 35, 36, 37, and particularly to the radially inner 34 and radially outer 35 walls.

According to one embodiment, said disc body 3 is an axisymmetric body which extends about the rotation axis A-A.

Figure 7:
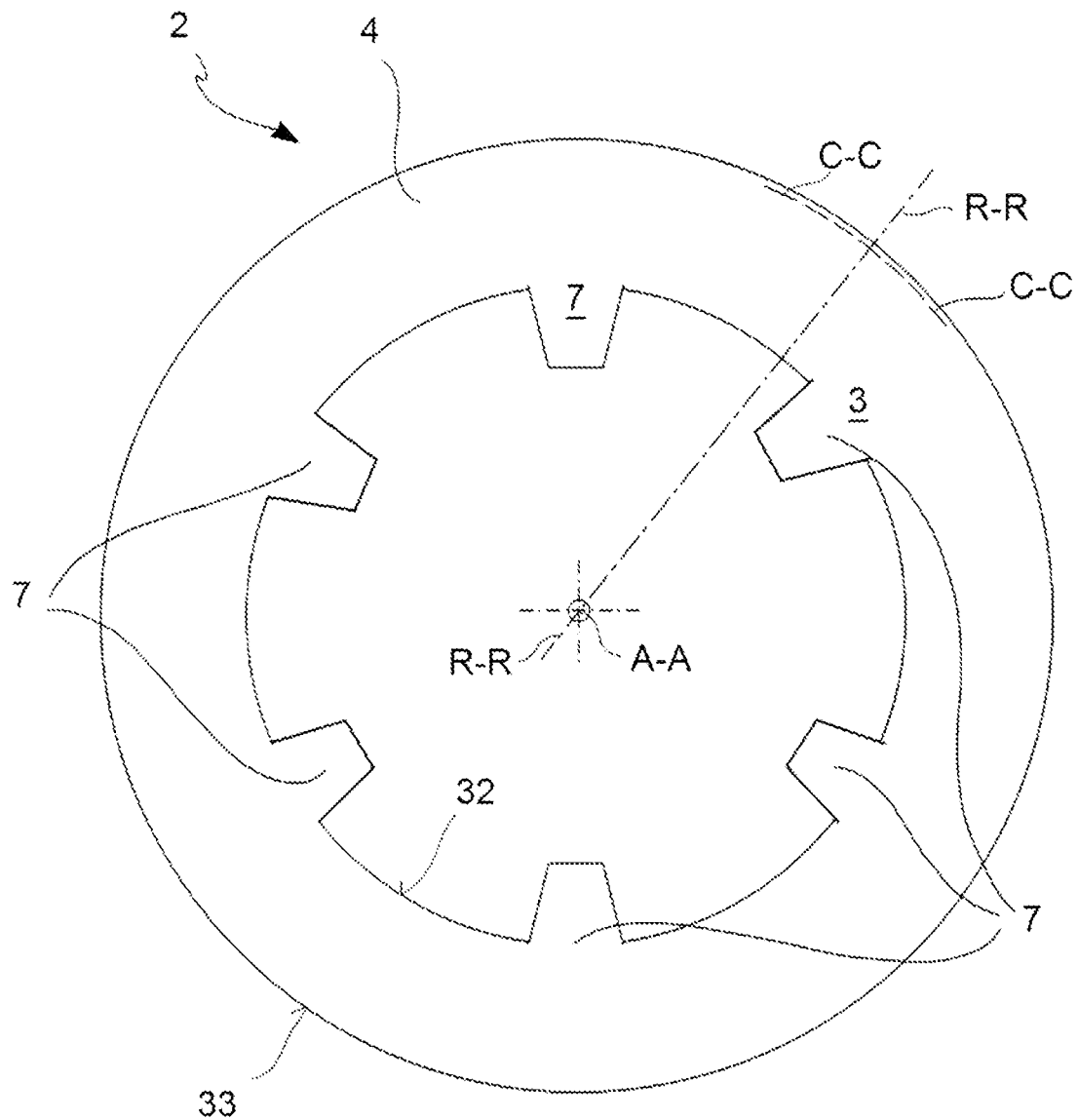
FIG. 7 is a raised diagram diagrammatically showing a disc of a disc brake.
Figure 8:
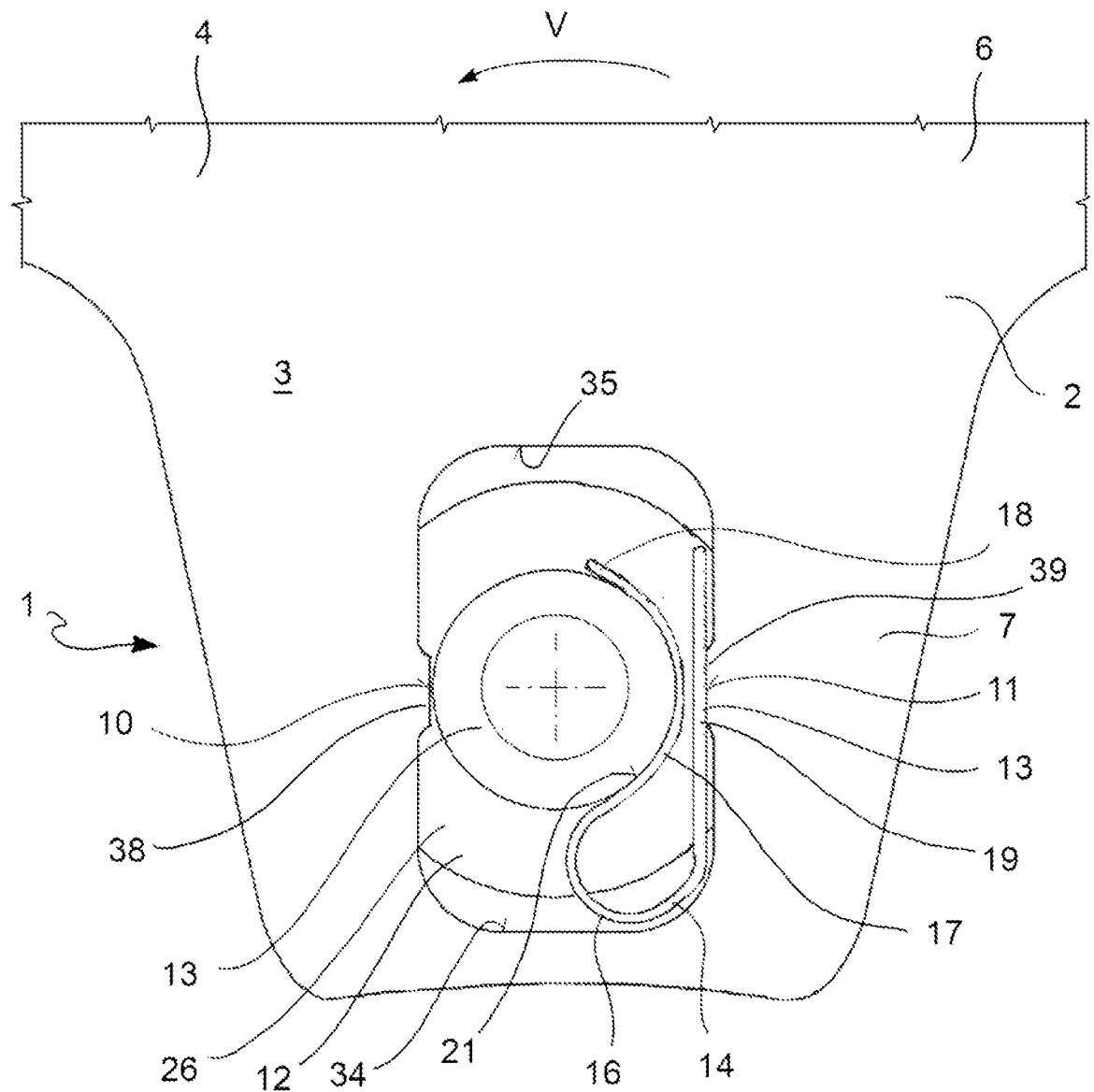
FIG. 8 is a raised view on a plane defined by the radial and circumferential directions, illustrating a braking device according to one embodiment, comprising a portion of disc, which faces a second braking surface, in which the braking device is connected to a connection device of an associable vehicle.
Figure 9:
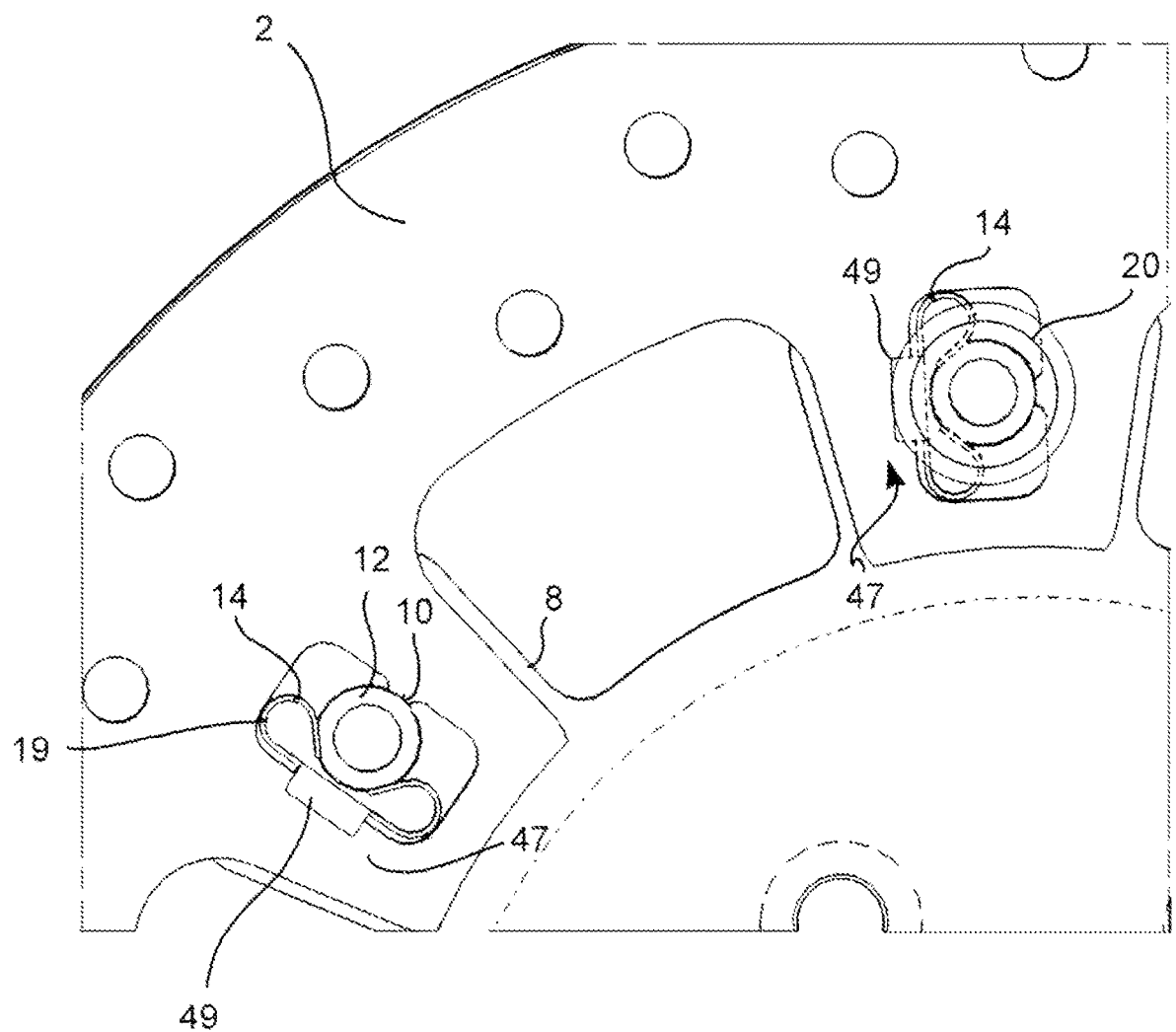
FIGS. 9 to 12 show the front view, according to a section on a circumferential and radial plane and according to an axial view of a detail, of a braking device according to a further embodiment again.
Figure 10:
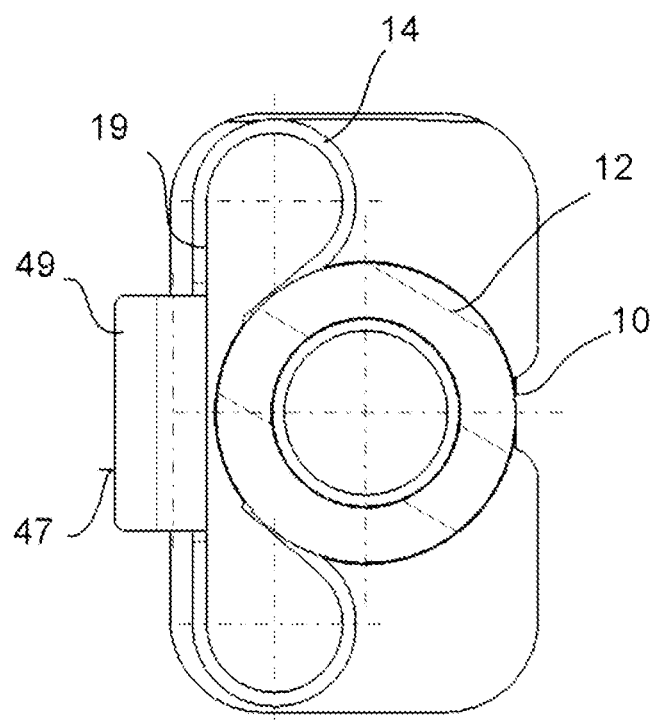
Figure 11:
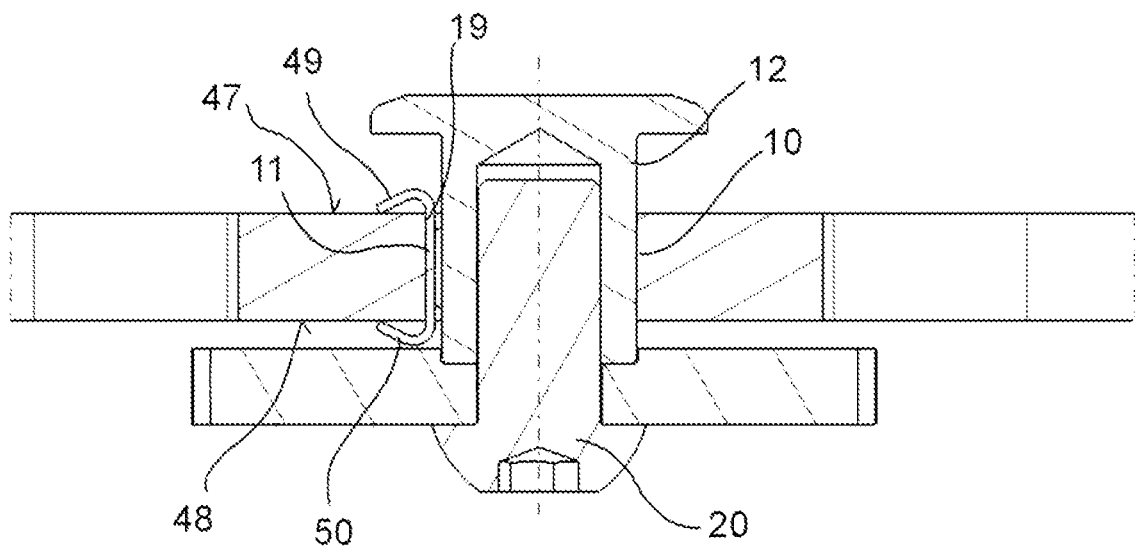
Figure 12:
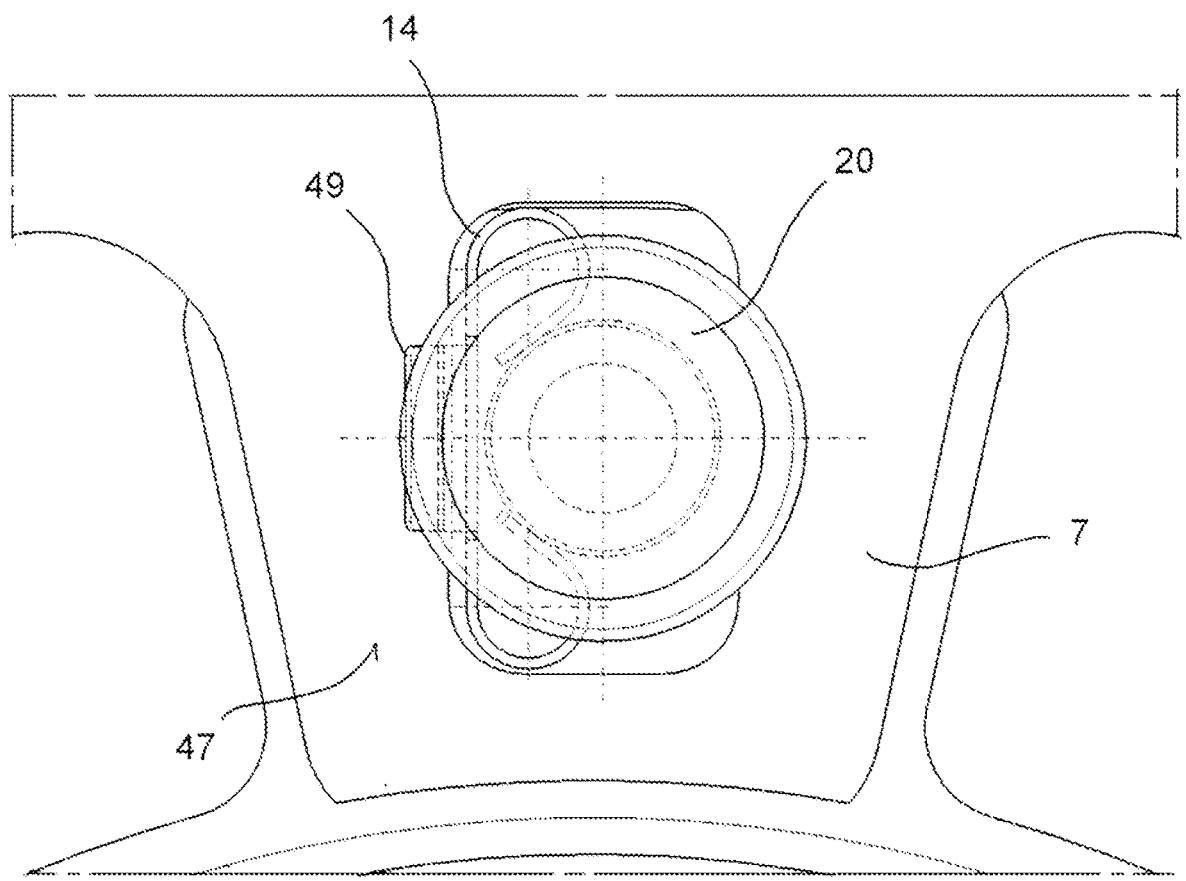

According to a preferred embodiment, said disc body 3 comprises a plurality of connection portions 7. For example, as shown in FIG. 7, said disc body 3 may comprise an even number of connection portions 7. Alternatively, said disc body 3 may comprise an odd number of connection portions 7.

According to one embodiment, said plurality of connection portions 7 are equally spaced from one another in circumferential direction C-C. Thereby, there may be a uniform distribution of the forces arising from the braking action, thus causing optimal stability of disc 2.

According to one embodiment, said seat walls 10, 11, 34, 35, 36, 37 of said disc body 3 comprise at least one dragging support wall 36 and at least one abutment support wall 37, opposed to said at least one dragging support wall 36.

According to a preferred embodiment, said connection portion 7 of said disc body 3 comprises at least one dragging protrusion 38 which protrudes cantilevered from said dragging support wall 36 into said seat 9, in which said dragging protrusion 38 comprises said dragging surface 10. According to a preferred embodiment, said connection portion 7 of said disc body 3 comprises at least one abutment protrusion 39 which protrudes cantilevered from said abutment support wall 37 into said seat 9, in which said abutment protrusion 39 comprises said abutment surface 11.

The combination of the provision of so-called dragging 38 and abutment 39 protrusions is particularly advantageous because it allows opposed definite contact areas to be defined of the disc body 3 with bush 12 and with the elastic element 14, respectively, in which the definition of the static and dynamic behavior of the interactions between the disc body 3 and elastic element 14 or bush 12 is of significantly improved predictability with respect to known solutions. Moreover, said dragging 10 and abutment 11 surfaces which form the definite contact areas thus defined advantageously have limited extension and since they are arranged on cantilevered protrusions 38, 39, they are easy to access for a numerically controlled machine-tool cutter, e.g. miller or boring mill, thus being manufacturable in series in a simple manner and with maximum manufacturing tolerances. For example, such dragging 10 and abutment 11 surfaces may be made during the finishing step of the braking surfaces 5, 6 of disc 2 without varying the positioning of disc 2 on the machine.

According to one embodiment, said dragging surface 10 and said abutment surface 11 have an extension in radial direction R-R which is greater than or equal to the thermal expansion of disc 2 during the braking.

The construction of at least one among said dragging protrusion 38 and said abutment protrusion 39 may also be provided independently of the provision of said at least one cantilevered arm 16. Thereby, "retro-fitting" may be performed, thus integrating said disc body 3 with elastic elements already on the market.

According to one embodiment, said abutment surface 10 comprises surface protrusions suitable for increasing the static and dynamic friction coefficient of such an abutment surface 10, such as for example knurls or protrusions made by rotary roughening.

According to one embodiment, said dragging protrusion 38 comprises a yielding device suitable for affecting said engagement portion 13 of said bush 12 against said elastic element 14. For example, said yielding device comprises at least one among a spring and a damper.

According to one embodiment, said braking device 1 comprises a fixing element 20, which sandwiches said bush 12 and said connection portion 7 of the disc body 3 against said connection device 8 of the associable vehicle, thus allowing the sliding of disc 2 in axial direction X-X with respect to the connection device 8.

According to one embodiment, said bush 12 comprises at least one shoulder device 25 suitable for being interposed between the disc body 3 and the fixing element 20. According to one alternative embodiment, said shoulder device 25 is suitable for being interposed between the disc body 3 and the connection device 8. According to one embodiment, said shoulder device 25 of bush 12 comprises an edge 26 which surrounds the engagement portion 13 of said bush 12 and forms at least one axial abutment surface 27 facing the disc body 3, and at least one opposite axial abutment counter-surface 28.

According to one embodiment, said fixing element 20 is a screw, by way of non-limiting example, a stud, accommodated in a seat hole 23 provided in bush 12 so as to connect said bush 12 to the connection device 8, in a non-limiting example, thus screwing in a threaded hole 24 provided in the connection device 8.

According to a preferred embodiment, when the fixing element 20 is completely tightened in the threaded hole 24 of the connection device 8, it sandwiches bush 12 and the disc body 3 against the connection device 8, and in which bush 12, with the axial abutment surface 27 thereof, delimits an axial stroke x1 of the engagement portion 13 of bush 12 which is greater than the axial dimension x2 of the connection portion 7 of the disc body 3 by a predefined axial clearance d. In other words, said bush 14 comprises a connection surface 29 suitable for resting against a connection counter-surface 30 provided in the connection device 8 of the associable vehicle, and in which said connection surface and said axial abutment surface 27 delimit the axial stroke x1 of the engagement portion 13 of bush 12 to be greater than the axial dimension x2 of the connection portion 7 of the disc body 3 by a predefined axial clearance d.

According to a general embodiment, there is provided a disc brake 40. Said disc brake 40 comprises at least one braking device 1 according to any one of the embodiments described above, and at least one brake caliper 41.

According to a preferred embodiment, said brake caliper 41 comprises a caliper body 42 arranged straddling disc 2 and which comprises two opposed elongated portions 43, 44, each facing an opposite braking surface 5, 6, and at least one caliper bridge 46 which connects said two opposed elongated portions 43, 44 to each other, and in which each of said two opposed elongated portions comprises at least one brake pad 22.

According to one embodiment, said brake caliper 41 comprises at least one thrust device 45 suitable for exerting a thrust action to tighten said brake pads 22 against said braking band 4 during the braking action. For example, said thrust device 45 comprises at least one cylinder-piston unit. According to one embodiment, said thrust device 45 exerts said thrust action directed in axial direction X-X.

According to one embodiment, said brake caliper 41 is a floating or sliding brake caliper. According to one embodiment, said brake caliper 41 is a fixed brake caliper.

According to a general embodiment, there is provided a vehicle comprising at least one braking device 1 according to any one of the embodiments described above, and at least one connection device 8, as described above, which is integral with a vehicle wheel and which constrains said disc 2 to said vehicle wheel.

According to a preferred embodiment, said vehicle comprises at least one disc brake 40, according to any one of the embodiments described above.

According to a preferred embodiment, said vehicle is a motorcycle.

In all the applications described, the coupling between seat 9 and bush 12 occurs by interposing an elastic element 14 which acts while affecting in circumferential direction C-C, thus avoiding elastic thrusts in axial direction A-A, and therefore allowing disc 2 to be auto-centered axially with respect to the brake pads 22. The possibility of axially auto-centering the brake disc 2 with respect to the brake pads 22 allows vibration phenomena in the device shown with reference to the known art, to be reduced or completely eliminated.

Moreover, due to the fact that seat 9 has an extension in radial direction R-R such as to allow a radial stroke of the brake disc 2 with respect to bush 15, in the event of thermal expansion caused by the increase in temperature generated with the generation of heat of the braking action, and simultaneously the elastic element 14 is suitable for affecting the bush also radially R-R, the thermal expansion of disc 2 may be compensated for thus avoiding the occurrence of deformations in the components of the braking device 1 which would create disturbing malfunctions and vibrations in the device.

The provision of a disc 2 associated with bush 12 with interposed said elastic element 14 suitable for abutting the bush against a dragging surface 10 of the disc body 3 allows a replacement kit to be made in which the components disc 2, bush 12 and elastic element 14 are preassembled at the factory, thus making the assembly and disassembly operations of the disc device 1 highly accurate, safe and quick.

A method for assembling a braking device 1 on a vehicle associable with the braking device is described below.

Said method comprises the following steps:

—A— pre-assembling said at least one elastic element 14 and said at least one bush 12 in said at least one seat 9 of disc 2, thus forming a braking device 1, as described above.

—B— associating said braking device 1 with at least one connection portion 8 of a wheel of a vehicle associable with the braking device 1.

According to a preferred operating method, said step A is performed at the factory and said step B is performed at the workshop. Thereby, a replacement kit is made.

According to one operating method, said step A first provides assembling said elastic element 19 in said seat 9 and then assembling bush 12 in said seat.

According to a preferred operating method, said step B is performed by using at least one fixing element 20.

The above-described braking device 1 simplifies the calibration operations and accordingly allows a highly refined adjustment or calibration to be performed on the preload effect of the elastic element 14 between disc body 3 and bush 12. Therefore, an improved uniformity is caused of the affecting forces distributed over the whole disc body 3.

Moreover, such a braking device 1 allows the static and dynamic behavior during the actual operating conditions to be predetermined during the design step of the elastic element 14 with a minimum error margin.

The provision of such balanced interactions between the elastic element 14, disc body 3 and bush 12 makes said braking device 1 particularly suitable for being assembled in a simple and intuitive manner.

Although the movable coupling between disc 2 and the connection device 8 of the associable vehicle is countered due to the interposition of said elastic element 14, it allows a favorable radial thermal expansion of disc 2 caused by the heat generated by the dissipation due to friction between brake pad 22 and braking band 4 of the kinetic energy of the vehicle associable with the braking device 1, and simultaneously the provision of such a friction portion 15 of the elastic element 14 ensures the correct position of axial centering balance of disc 2 between the brake pads 22, thus avoiding any elastic return or thrust action in axial direction X-X, and simultaneously the provision of said arm 16 of said elastic element 14 affects said bush to abut against said dragging surface 10 of the disc body 3 in a predictable manner.

Moreover, it may be possible to vary the position of the axial centering balance in a range which, although narrow, is broad enough to allow adaptation over time to the advancing state of wear of the pads. The correct axial centering of the braking band 4 between the brake pads 22 ensures that the clearance which is dynamically caused upon release, prevents all sliding contact between the brake pads 22 and the braking band 4, and therefore avoids the occurrence of vibration phenomena. Likewise, a uniform level of wear of the brake pads 22 is promoted and both the warping of the disc body 3 and the misalignment of disc 2 are avoided. Moreover, the presence of the elastic element 14 causes the correct angular positioning of the brake disc, always in contact on the dragging surface 10 of the disc body 3.

The braking device 1 of the present invention allows braking conditions to be obtained with high operating temperatures of disc 2 and reduced dimensions, thus making it particularly suitable for applications which are critical in terms of volumes and also performance.

A person skilled in the art may make many changes and adaptations to the embodiments described above or can replace elements with others which are functionally equivalent in order to satisfy contingent needs without however departing from the scope of protection of the appended claims.

According to one alternative embodiment, a disc having said connection portion 7 comprises an axial surface of connection portion 47 which delimits said connection portion 7 in an axial direction.

According to one embodiment, said elastic element 14 comprises a first extension of the attachment root of elastic element 49 which extends from said attachment root 19 and protrudes folding to axially rest against said axial surface of connection portion 47, thus axially constraining said elastic element.

According to one embodiment, said connection portion 7 comprises an axial counter-surface of connection portion 48, opposite to said axial surface of connection portion 47. Said axial counter-surface of connection portion 48 delimits said connection portion 7 in an axial but opposite direction.

According to one embodiment, said elastic element 14 comprises a second extension of the attachment root of elastic element 50 which extends from said attachment root 19, which is opposite with respect to said first extension of the attachment root of elastic element 49, and protrudes folding to axially rest against said axial counter-surface of connection portion 48, thus axially constraining said elastic element.

LIST OF REFERENCES

1. Braking device
2. Disc
3. Disc body
4. Braking band
5. First braking surface
6. Second braking surface
7. Connection portion
8. Connection device of a vehicle
9. Seat
10. Dragging surface
11. Abutment surface, or tangent abutment surface
12. Bush
13. Engagement portion
14. Elastic element
15. Friction surface
16. Arm
17. Working portion
18. Terminal end
19. Attachment root
20. Fixing element
21. Contact surface
22. Brake pad
23. Bush seat hole
24. Hole
25. Shoulder device
26. Edge
27. Axial abutment surface
28. Axial abutment counter-surface
29. Connection surface
30. Connection counter-surface
31. Extended contact point, or contact area
32. Radially inner edge of the disc
33. Radially outer edge of the disc
34. Radially inner wall of the seat
35. Radially outer wall of the seat
36. Dragging support wall
37. Abutment support wall
38. Dragging protrusion
39. Abutment protrusion
40. Disc brake
41. Brake caliper
42. Caliper body
43. First elongated portion of caliper body
44. Second elongated portion of caliper body
45. Thrust device
46. Caliper bridge
47. Axial surface of the connection portion
48. Axial counter-surface of the connection portion
49. First extension of the attachment root of the elastic element folded to axially support
50. Second opposite extension of the attachment root of the elastic element folded to axially support
A-A. Rotation axis of the disc
X-X. Axial direction
R-R. Radial direction
C-C. Tangential direction or circumferential direction
V. Disc rotation direction
d. Predefined axial clearance
x1. Axial stroke of the bush
x2. Axial dimension of the disc

The invention claimed is:

1. A braking device for a vehicle, comprising a disc of a disc brake suitable for rotating about a rotation axis, wherein said disc comprises a disc body; and wherein said disc body comprises a braking band having opposite braking surfaces; and
wherein said disc body comprises at least one connection portion suitable for connecting the disc to a connection device of a vehicle associable with the braking device; and wherein said braking band defines an axial direction parallel to the rotation axis of the disc, a radial direction orthogonal to the axial direction and a tangential direction or circumferential direction, orthogonal both to the axial direction and to the radial direction;

and wherein said at least one connection portion comprises seat walls which delimit at least one seat;

and wherein said seat walls comprise:
at least one dragging surface suitable for receiving a thrust action directed in circumferential direction,
at least one abutment surface opposed to said dragging surface;

and wherein said braking device further comprises at least one bush, suitable for being connected to a portion of said connection device;

and wherein said at least one bush comprises at least one engagement portion which is inserted with clearance into said seat, and wherein said braking device comprises at least one elastic element interposed between said abutment surface and said engagement portion of said bush;

and wherein said at least one elastic element comprises at least one arm, which projects cantilevered into said seat and which comprises a free terminal end and an attachment root, which comprises at least one contact area of said elastic element with said seat walls;

wherein said at least one arm comprises at least one working portion which touches said engagement portion of said bush and affects said bush to abut against said dragging surface, wherein said at least one working portion of said at least one arm affect said at least one bush in said radial direction.

2. The braking device according to claim 1, wherein said at least one working portion of said at least one arm exerts a mainly elastic thrust action on said bush to abut against said dragging surface; and/or wherein said at least one working portion of said at least one arm which touches said at least one engagement portion of said bush exerts an exclusively elastic thrust action on said bush to abut against said dragging surface.

3. The braking device according to claim 1, wherein said at least one elastic element exerts a preload which keeps the disc in contact with said at least one engagement portion of said bush; and/or wherein said at least one arm, which projects cantilevered into said seat, remains free from stresses or constraints imposed by the seat walls.

4. The braking device according to claim 1, wherein said at least one elastic element comprises at least one friction surface, in contact with said abutment surface, which exerts a resistance action to the movement in axial direction of the disc with respect to the at least one bush, thus avoiding to exert an elastic return or thrust action in said axial direction on the disc; and/or wherein said dragging surface and said abutment surface have an extension in said radial direction which is greater than or equal to the thermal expansion of the disc during the braking.

5. The braking device according to claim 1, wherein said at least one elastic element comprises two of said arms, so as to form a pair of arms which extend cantilevered with respect to a portion of said elastic element in contact with said seat walls; and/or wherein said elastic element is made of spring steel; and/or wherein said elastic element comprises a leaf spring.

6. The braking device according to claim 1, wherein said least one connection portion of said disc body comprises a plurality of connection portions; and/or wherein said at least one connection portion comprises an axial surface of said at least one connection portion which delimits said at least one connection portion in an axial direction; and wherein said at least one elastic element comprises a first extension of the attachment root of said at least one elastic element which extends from said attachment root and protrudes folding to axially rest against said axial surface of at least one connection portion; and wherein said at least one connection portion comprises an axial counter-surface of said at least one connection portion, opposite to said axial surface of said at least one connection portion, which delimits said at least one connection portion in an axial but opposite direction; and wherein said at least one elastic element comprises a second extension of the attachment root of at least one elastic element which extends from said attachment root, which is opposite with respect to said first extension of the attachment root of at least one elastic element, and protrudes folding to axially rest against said axial counter-surface of said connection portion.

7. The braking device according to claim 1, wherein said seat walls of said disc body comprise at least one dragging support wall and at least one abutment support wall, opposed to said at least one dragging support wall.

8. The braking device according to claim 1, wherein said braking device comprises at least one fixing element, which sandwiches said at least one bush and said at least one connection portion of the disc body against said connection device of the associable vehicle so as to allow the sliding of the disc in said axial direction with respect to the connection device; and/or wherein said shoulder device of the at least one bush comprises an edge which surrounds the at least one engagement portion of said bush and forms at least one axial abutment surface facing the disc body, and at least one opposite axial abutment counter-surface.

9. A braking device according claim 6, wherein said plurality of connection portions are equally spaced from one another in said circumferential direction.

10. A braking device according to claim 6, wherein said at least one connection portion of said disc body comprises at least one dragging protrusion which protrudes cantilevered from said dragging support wall into said seat walls, said dragging protrusion comprising said dragging surface; and/or wherein said at least one connection portion of said disc body comprises at least one abutment protrusion which protrudes cantilevered from said abutment support wall into said seat walls, said abutment protrusion comprising said abutment surface.

11. A braking device according to claim 8, wherein said at least one bush comprises at least one shoulder device suitable for being interposed between the disc body and the fixing element;

and/or wherein said at least one fixing element is a screw accommodated in a seat hole provided in the at least one bush so as to connect said at least one bush in a threaded hole provided in the connection device;

and/or wherein when the at least one fixing element is completely tightened in the threaded hole of the connection device, the at least one fixing element sandwiches the at least one bush and the disc body against the connection device, and wherein the at least one bush, with the axial abutment surface thereof, delimits an axial stroke of the at least one engagement portion of the at least one bush which is greater than an axial dimension of the connection portion of the disc body by a predefined axial clearance.

* * * * *